United States Patent Office 3,333,608
Patented Aug. 1, 1967

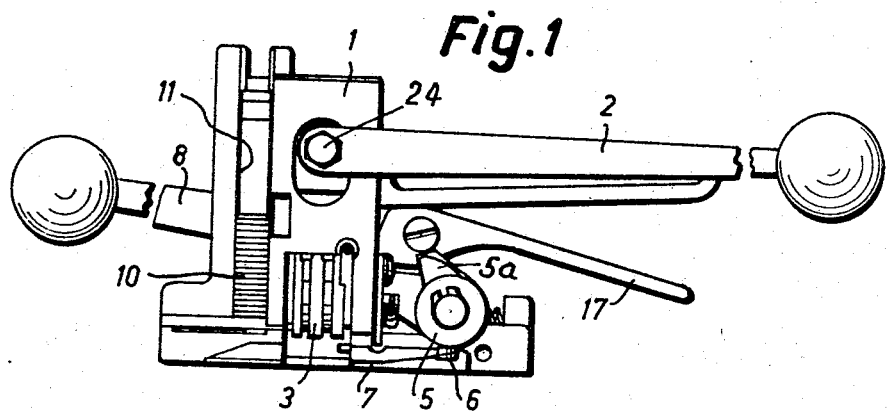
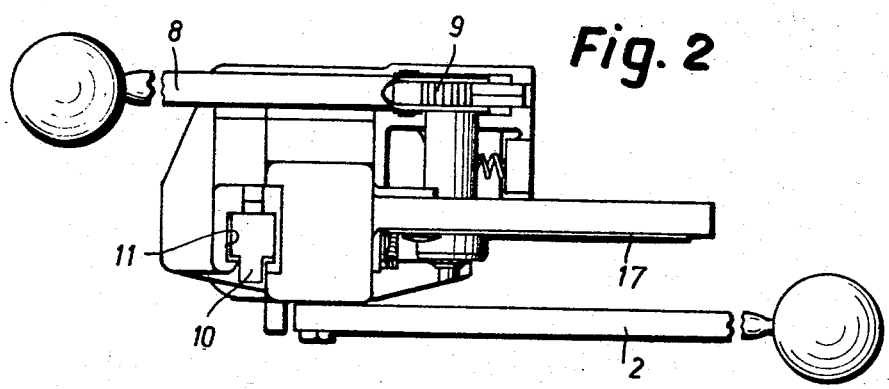
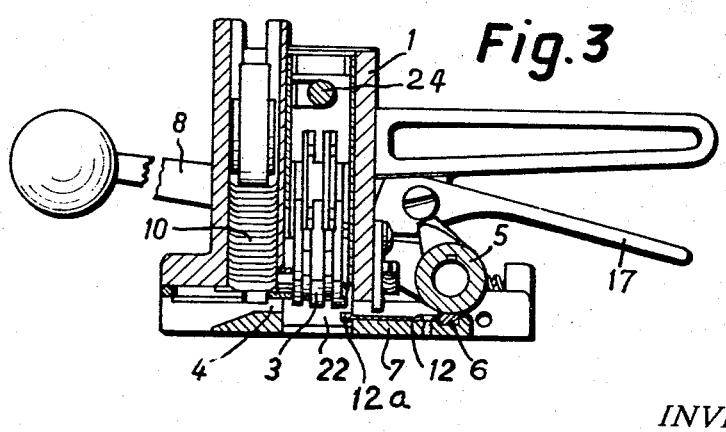

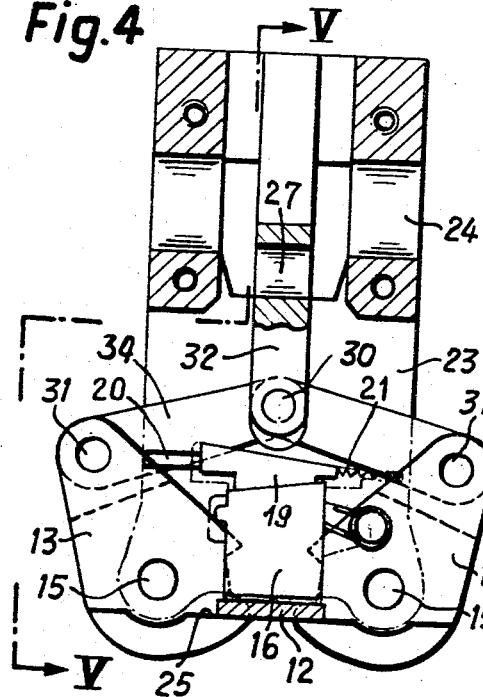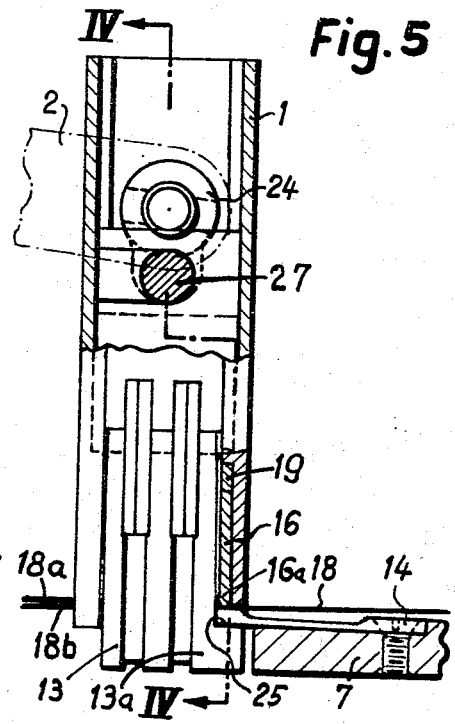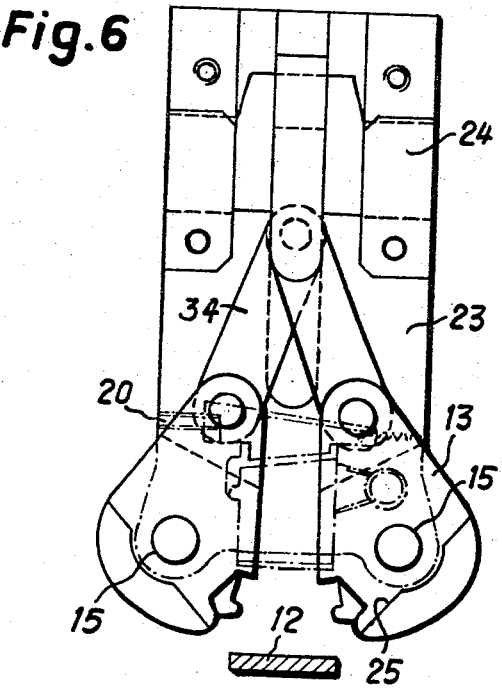

3,333,608
TIGHTENING AND CLOSURE DEVICE FOR BAND-LIKE CLOSURE HOOPS
Xaver Kuoni, Zurich, Switzerland, assignor to Borbe-Wanner AG, Zurich, Switzerland, a corporation of Switzerland
Filed Jan. 28, 1965, Ser. No. 428,720
Claims priority, application Switzerland, Feb. 4, 1964, 1,265/64
4 Claims. (Cl. 140—93.2)

ABSTRACT OF THE DISCLOSURE

An improved tightening and closure device for hooping objects with flexible bands wherein a pair of clamping jaws are provided for applying a closure element about the overlapping portions of the hooping band. A countersupport is connected to a base plate of the apparatus and beneath a cutting mechanism. By virtue of this arrangement it is possible to regulate the depth of notching or scoring of the band with extreme preciseness and to make such completely independent of the degree of tensioning of the enclosing band.

The present invention has reference to an improved tightening and closure device for hooping objects with flexible bands formed into hoops, such device incorporating mechanism for separating the end of the band leading to a supply roller.

Apparatuses of this type used for hooping objects with bands or straps are already known to the art in a number of different physical constructions. A problem existing with such apparatuses is that the separation or cutting of the band end causes difficulties when using previously conventional cut-off mechanisms. These difficulties are due to the fact that the end of the band which is to be cut located directly adjacent the closure sleeve or seal and which is not supported from below, in other words lies freely in the separating zone, bends through to a less or greater extent under the pressure of the cutting knife depending upon the tautness of the hoop. As a result, great differences appear in the depth of the scoring or notches made by the cutting knife. If the depth of the notch is too small then breaking-off of the end of the band leading to a supply source e.g. supply roller is difficult, and, on the other hand, if the depth of the notch is too large the danger exists that the band situated beneath the band end which is notched and which serves to provide the actual closure hoop will also be damaged i.e. scored or notched for instance. Moreover, it is not possible to support the closure sleeve from beneath since the closure clamps which serve to deform the aforesaid sleeve must engage beneath the latter.

Accordingly, it is a primary object of the present invention to provide an improved tightening and closure device for band-like hoops which overcomes the mentioned disadvantages.

A further very important object of the present invention is directed to the provision of an improved tightening and closure device for band-like hoops incorporating means for supporting the band at a location beneath a cutting mechanism so that the depth of the notch made by the cutting mechanism at the band end to be severed is substantially constant each time the cutting mechanism operates and irrespective of the tautness of the hoop encircling the object which is wrapped.

Another considerable object of this invention is to provide an improved tightening and closure device for band-like hoops wrapped about an object incorporating means for supporting the band in the separation zone beneath a cutting mechanism, and wherein the clamp jaws for deforming the closure sleeve which secures or interlocks the band into hoop form is constructed to urge the supporting means somewhat in the direction of the cutting mechanism as well as itself providing a support for the supporting means.

In order to implement these and still further objects of the present invention as well as to effectively overcome the disadvantages of the prior art mentioned herein the present invention, broadly speaking, contemplates providing a countersupport connected at the base plate of the inventive apparatus, this countersupport cooperating with the cutting knife of a cutting mechanism. Due to this arrangement it is possible to regulate the depth of notching of the band with great exactness and to make such independent of the more or less taut tensioning of the enclosing band.

Other features, objects and advantages of the present invention will become apparent by reference to the following detailed description and drawings in which:

FIGURE 1 schematically illustrates a side view of the inventive apparatus;

FIGURE 2 is a top plan view of the apparatus of FIGURE 1;

FIGURE 3 is a vertical sectional view of the inventive apparatus in a position substantially analogous to that of FIGURE 1;

FIGURE 4 is a cross-sectional view of the inventive apparatus taken along the line IV—IV of FIGURE 5;

FIGURE 5 is a fragmentary view showing a detail of the closure mechanism including clamping jaws together with the cutting knife and the countersupport plate after removing the cut-off band; and FIGURE 6 shows the clamping jaws for deforming the closure sleeve in open position.

It will be understood that the inventive tightening and closure device is quite similar in physical structure and mode of operation to the apparatus described in United States Patent 2,813,441, granted Nov. 19, 1957, invented by Jakob Rosenberger and Erich Borbé, and entitled "Hoop Iron Tightening and Clamping Device," and the therein described function can be considered to be substantially analogous to the present apparatus. However, certain basic and very important improvements have been made thereto and such will be considered and fully explained as the description proceeds. Generally speaking, it will be appreciated that the described apparatus serves to apply a closure sleeve or seal about the overlapping ends of a flat band tensioned in hoop-like manner about a carton, box or the like, whereby the aforesaid closure sleeve together with the band ends is clamped or deformed such that the hoop-shaped band encircling the wrapped objects remains in tightly tensioned condition after removing the apparatus.

Considering now specific physical structure of the inventive tightening and closure device and by initially referring to FIGURE 1, it will be seen that such device or apparatus embodies a housing 1 in which a closure mechanism 3 is displaceably arranged. This closure or clamping mechanism 3 embodies a pair of pivotal clamp jaws 13. The operation of such clamp jaws is similar to the previously mentioned United States patent, yet will again be considered herein to an extent considered necessary for understanding the teachings of the present invention. In the illustrated embodiment actuation of the closure mechanism 3 is effected by pivoting or rocking an actuation lever 2 through approximately 180°. A clamping lever 17 is provided in order to fixedly retain the band in its correct position in a band-receiving channel 4. A tensioning roller 5 having a nose portion 5a actuated by the tensioning lever 17 and a counter holder 6 at the underface thereof supported by a base plate 7 of the device cooperate with the band 18. The counter holder 6 as well as a countersupport plate 12 are rigidly connected to the base plate 7 of the housing 1. A tensioning lever 8 serves to tension or draw the band 18 tautly about a non-illustrated object and engages in a toothed ratchet wheel 9 via a non-illustrated ratchet or pawl. As it is known, actuation of this tensioning lever 8 effects drawing and tensioning of the band 18.

The pre-shaped, still open, substantially channel-shaped closure sleeves or seals 10 are located in stacked condition in a magazine or chute 11, sliding downwardly in such. Bending of the closure sleeve 10 about both of the superimposed band ends 18a, 18b located in the band channel 4 and the deformation thereof with the closure sleeve takes place in known manner by means of the up and down movable, pivotable clamp jaws 13. These clamp jaws 13 engage beneath the closure sleeve 10 at such time as the actuation lever 2 is pivoted as previously explained. The countersupport plate 12 advantageously consisting of a resilient hardened steel and secured to the base plate 7 by means of a screw 14 for instance, extends with its free end 12a laterally into the outermost portion 13a of the clamp jaws 13 and, thus, into the free passage or recess 22 of the base plate 7, as such is best seen by referring to FIGURES 4 and 5. It will be understood that the clamp jaws 13 when they move into their clamping position extend into the recess 22 and engage from beneath the countersupport plate 12 by means of shoulders 25 provided thereat.

The clamp jaws 13 disposed to the left and right of the countersupport plate 12 in FIGURE 4, are each mounted to pivot about a bolt member 15 housed in an up and down displaceable closure body member 23. This closure body member 23 is movable up and down by means of a crank arm 27 disposed in the housing 1 and rotatable by the shaft 24. The closing and opening movement of the clamp jaws 13 is transmitted by arms 34 pivotally connected by bolts 31, 30 to the rod 32 and the clamp jaws, respectively. Moreover, the outermost clamp portion 13a of each clamp jaw 13 is provided with a shoulder 25 (FIGURE 5), against which the countersupport plate 12 comes to bear in the closing position of the clamp jaws 13. As a result, the free end 12a of the countersupport plate 12 bears against the rockable clamp jaws 13 and together with the latter moves upwardly a small amount. In so doing, the countersupport or counterpressure plate 12 extends approximately into about one-third to two-thirds of the width of the outermost clamp portion 13a.

A cutting mechanism, for instance in the form of a chisel or cutting knife 16 is located above the countersupport plate 12 and directly behind the closure sleeve 10 to be applied to the band. Hence, the cutting knife 16 also serves as an abutment or stop means for the closure sleeve 10. This cutting knife 16 is sharpened at its lower end 16a into a cutting edge which cooperates with the width of the band 18. It will be appreciated that the band 18 incorporating the overlapping band ends 18a, 18b is located between the cutting edge 16a of the cutting knife 16 and the countersupport plate 12. In FIGURE 5 the upper end of the band 18 leading to a non-illustrated supply source, that is, to the right of the cutting knife 16, has already been removed. Such cutting knife 16 applies a notch or scoring to the upper band end 18a at the end of the closing movement of the clamping jaw 13, in other words, weakens such upper band end 18a, since the aforesaid plate 12 presses both of the superimposed band ends 18a, 18b against the cutting knife 16.

Due to such, the upper band 18a is either completely cut-through or scored to such an extent that it can be easily bent-off and removed from its supply source. Thus, the term "notching" as used herein as well as the cutting knife 16 for doing such, in the ideal case is also intended to embrace cutting through of the upper band end 18a without damaging the lower band end 18b.

The cutting knife 16 cooperates at its upper edge with a wedge means 19 capable of being displaced by means of a screw 20 or equivalent expedient against the pressure of a spring 21. The position of the cutting knife 16 relative to the countersupport plate 12 can therefore advantageously be adjusted by means of the screw 20 and, thus, there can be achieved regulation of the depth of the notching or scoring with regard to the momentarily employed band thickness.

It will be understood that in addition to metallic bands it is also possible to use bands formed of other materials. When using bands formed of synthetic materials like plastic, for example on the basis of polyamides, it is advantageous to provide an undulatory or wave-shaped bending of the closure sleeve, instead of a closure sleeve with lateral indentations. By doing such, it is possible to considerably safeguard against damage or rupture of the synthetic band. Additionally, it would be possible to provide a suitable welding apparatus for such plastic bands instead of the closure mechanism having clamp jaws and employing sleeves as shown in the drawing, with separation of the band taking place in analogous manner directly behind the welding location.

While there is shown and described a present preferred embodiment of the invention it is to be distinctly understood that the invention is not limited thereto but may be otherwise variously embodied and practised within the scope of the following claims.

What is claimed is:

1. Tightening and closure apparatus for hooping objects with flexible bands comprising means for drawing a flexible band taut around an object with the ends of said band overlapping, means for notching the upper band end of said overlapping band ends, means for interlocking said overlapping band ends to maintain said flexible band taut about said object, said interlocking means for said closure element comprising a pair of cooperating clamp jaws capable of applying a closure sleeve to said overlapping band ends, a base plate, said base plate incorporating a recess for receiving said clamp jaws when the latter move into position for applying said closure element to said overlapping band ends, a countersupport plate connected with said base plate positioned to cooperate with said notching means, said countersupport plate being resilient and extending laterally into said recess and being engaged from beneath by a portion of said clamping jaws when the latter have moved into said position for applying said closure element, whereby said clamp jaws serve as a support for said countersupport plate.

2. Tightening and closure apparatus for hooping objects with flexible bands as defined in claim 1, wherein said clamping jaws are provided with shoulder means defining said support and which engage beneath said countersupport plate.

3. Tightening and closure apparatus for hooping objects with flexible bands as defined in claim 1, wherein said notching means comprises a knife-like element, a displaceable wedge means cooperating with said knife-like element for adjusting the depth of notching thereof in accordance with the thickness of said flexible band, said knife-like element being located above said countersupport plate.

4. In a tightening and closure apparatus for hooping objects with flexible bands incorporating a base plate provided with a recess, means for applying a closure element to the flexible band hooping the object in order to interlock overlapping ends of said flexible band, said applying means extending into said recess when applying said closure element to said flexible band, a countersupport plate connected with said base plate laterally extending into said recess, cutting knife means disposed directly above said countersupport plate for carrying out separation of the flexible band hooping the object from its supply source, said applying means comprising a portion cooperating with said countersupport plate for supporting the latter from beneath during separation of the upper band end of said overlapping ends.

References Cited

UNITED STATES PATENTS

| | | | |
|---|---|---|---|
| 2,097,946 | 11/1937 | Childress | 140—123.6 |
| 2,283,947 | 5/1942 | Praemassing | 140—93.4 |
| 2,797,714 | 7/1957 | MacChesney | 140—93.2 |
| 3,013,589 | 12/1961 | Jones | 140—93.2 XR |
| 3,021,876 | 2/1961 | Hall et al. | 410—93.4 |

WILLIAM J. STEPHENSON, *Primary Examiner.*